ROBERT B. DODDS
AARNE A. LUOMA
INVENTORS

ROBERT B. DODDS
AARNE A. LUOMA
INVENTORS

BY Daniel A. Bobis
ATTY

ROBERT B. DODDS
AARNE A. LUOMA
*INVENTORS*

United States Patent Office 2,976,689
Patented Mar. 28, 1961

2,976,689

REMOTE CONTROL MEANS FOR CONTROLLING OPERATION OF PRIME MOVERS IN A CONTINUOUS PROCESS

Robert B. Dodds and Aarne A. Luoma, Wellsville, N.Y., assignors to Worthington Corporation, Harrison, N.J., a corporation of Delaware Filed Sept. 20, 1954, Ser. No. 457,205

8 Claims. (Cl. 60—102)

This invention relates generally to control systems and more particularly to a control system for regulating the individual and collective speed of prime mover driving means such as turbines utilized in a continuous process, which control is disposed at a point remote from the system being controlled.

In a continuous process having a series of operations such as in the sugar making industry, paper manufacturing industry, etc., it is highly desirable to have a speed control mechanism on each of the driving units which will allow each conveyor or other step in the process to operate at its own independent speed and at the same time provide means to adjust the system to increase or decrease the speed of the entire process whereby optimum operation may be obtained. One method and apparatus for producing this result is illustrated in Patent No. 2,674,854 to Church.

The present invention covers a remotely disposed control means adapted to produce this result which includes individual fluid operated controls adapted to coact with the governors on the prime movers to modify the speed thereof, and a master control to actuate and vary the relative speed reference points of said fluid operated controls whereby all the prime movers will have their respective speeds increased or decreased a proportional amount, without changing the individual control settings for each prime mover.

With these and other objects in view, as may appear from the accompanying specification, the invention consists of various features of construction and combination of parts, which will be first described in connection with the accompanying drawings, showing a remote control means for controlling operation of prime movers in a continuous process of a preferred form embodying the invention, and the features forming the invention will be specifically pointed out in the claims.

Figures 1, 2:
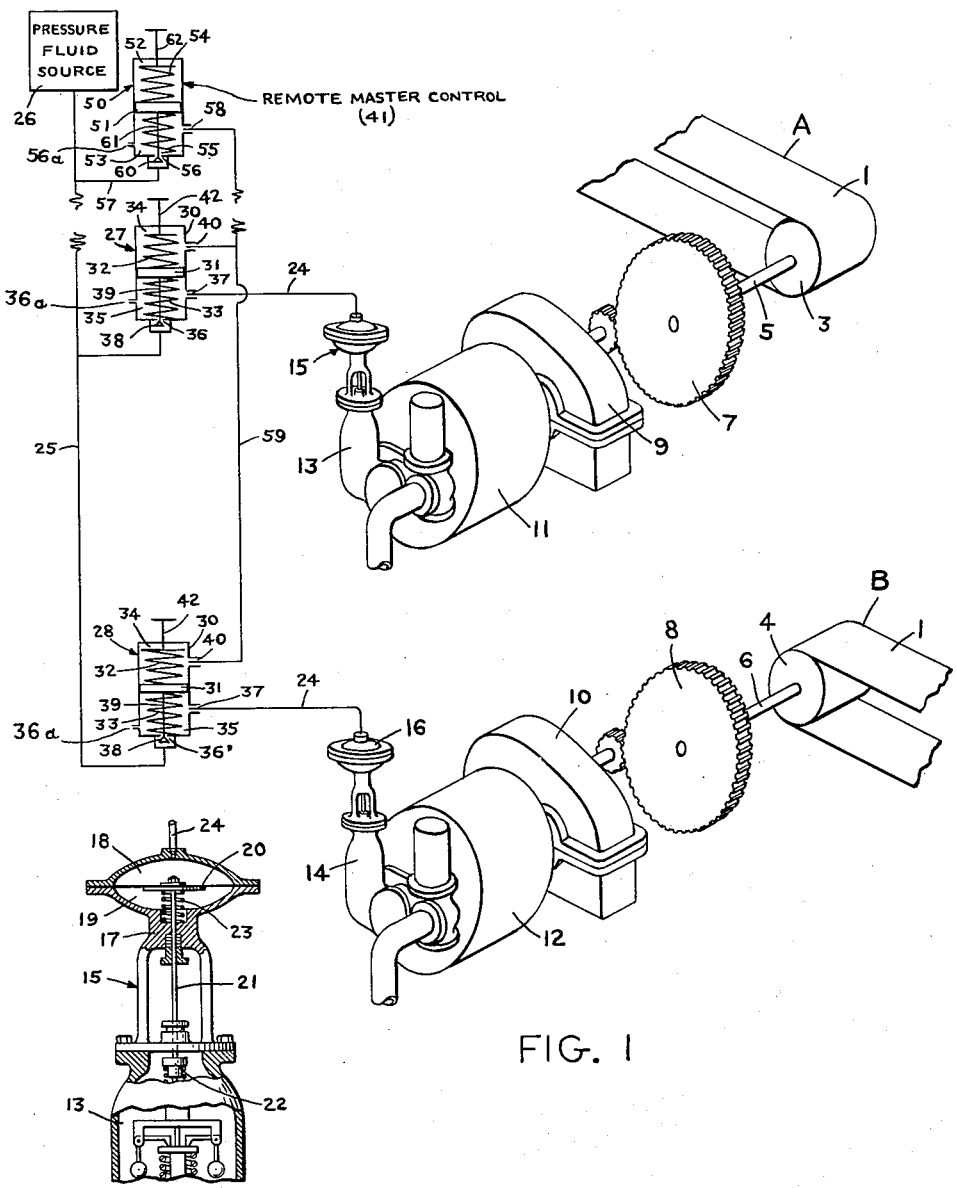
Figure 1 is a diagrammatic view showing the invention as applied to one system.
Figure 2 is an enlarged view illustrating the relationship between the individual control and the governor of the prime mover.

Referring more particularly to the drawings, Figure 1 represents diagrammatically a continuing type process in which, for example, a series of conveying steps are to be performed by the conveyors designated generally as A and B. While conveying operations are indicated in the present invention, it is understood that this could be any of the steps in any continuous process and that conveying steps are merely utilized for the purposes of illustrating the present invention.

The conveyors A and B include belts 1 and 2 mounted about rollers 3 and 4 only one roller being illustrated for the purposes of clarity, it being understood that those skilled in the art are fully familiar with such conveyors and the driving means therefor and for this reason this is not more fully discussed herein.

The rollers 3 and 4 are in turn driven through driving shafts 5 and 6, the gears 7 and 8 fixedly connected thereto and conventional reduction gearings 9 and 10, by their respective prime movers 11 and 12 such as steam turbines, etc.

The speed of each of the prime movers is generally controlled by a speed governor as at 13 and 14, which governors may be of any suitable type such as the flyball type easily purchasable on the open market. The governors are adjustable and are utilized to hold the speed of the prime movers substantially constant at their particular setting. They act to regulate the fuel or steam delivered to the prime movers 11 and 12 in the manner well known in the art. It will be understood that while the present type governor is illustrated and described that this invention is equally adaptable to other forms of governors, particularly the hydraulic orifice type governor.

The present invention embodies a control to coact with the governors and to control the same whereby a single operator may increase or decrease the speed of individual prime movers and also may increase or decrease the speed of the entire process from a remote control point.

This is accomplished by individual fluid pressure responsive controls such as 15 and 16 for each of the governors, which controls coact therewith as hereinafter described only one of the controls being illustrated and described and shown in Figure 2 of the drawings as the remaining controls are substantially identical thereto.

Thus Figure 2 shows one of the pressure responsive controls 15 as having a casing 17 mounted on its respective governor 13. The casing is divided into an upper or pressure chamber 18 and a lower chamber 19 by a diaphragm member 20. The diaphragm member is connected to a plunger rod 21 adapted to extend into the governor and engage and move the actuating element 22 of the governor 13. The plunger rod 21 is held out of engagement with the actuating element 22 by a spring element 23 disposed about the plunger rod 21 in the lower chamber so that it abuts between the casing 17 and the underside of the diaphragm member 20. The plunger rod is moved into engagement with the actuating element 22 by the action of pressure fluid in the pressure chamber 18 delivered to each of the pressure responsive controls through connecting conduits 24 communicating with a common pressure supply line 25 taking pressure fluid from the pressure fluid source 26. The upper side of the diaphragm member 20 forms one side of the pressure chamber 18 so that when the pressure fluid enters the pressure chamber 18 it acts on and moves the diaphragm and the plunger rod 21 connected thereto. This in turn actuates the actuating element 22 of the governor to set the governor at the desired speed setting.

When the pressure fluid acts on the diaphragm 20, it also compresses the spring element 23 so that when the pressure fluid is released, the spring 23 returns the plunger rod 21 to the non-engaging position.

The pressure fluid conveyed through each of the connecting conduits 24 to the pressure responsive controls 15 and 16 is controlled by adjustable spring loaded fluid pressure regulators as at 27 and 28. It will be understood that the adjustable spring loaded fluid pressure regulator may be of any suitable type of which there are many easily purchasable on the open market.

Each of the adjustable spring loaded pressure regulators 27 and 28 for the prime movers shown diagrammatically in Figure 1 of the drawings comprises a hollow casing 30 having a slidable or movable element 31 held therein by oppositely disposed resilient elements or springs 32 and 33 which engage between opposite sides of the movable element 31 and the walls of the casing opposite said side of the element. The movable element or member 31 divides the casing into an upper chamber 34 and a lower chamber 35. The lower chamber 35 communicates with the common line or duct 25 receiving pressure fluid from the pressure fluid source 26 through the inlet ports 36 opening into the lower chamber and delivering pressure fluid through outlet ports 37 to the connecting conduit 24 communicating with the balancing or pressure chamber 18 in the pressure responsive devices. The inlet ports 36 are throttled by valve heads 38 disposed at the lower end of valve stems 39 whose upper ends connect to and are movable with the movable elements 31.

In addition, each of the lower chambers are provided with leakage orifices designated 36a. Since the pressure fluid source 26 will deliver pressure fluid to the inlet ports 36 at constant pressure, the pressure that will be acting in the lower chamber 35 and delivered through the outlet ports 37 to the connecting conduits 24 will depend on the relative difference between the area of the inlet ports 36 and the area of the leakage orifices 36a.

The pressure acting in the lower chamber 35 of each of the regulators 27 and 28 can be varied by actuating the movable elements 31 thereof. The movable elements 31 being balanced by the differential force between the spring elements 32 and a reference fluid pressure admitted to the upper chamber 34 through inlet ports 40 thereof from a master controller generally designated 41 on one side and by the lower springs 33 and the pressure fluid admitted to the lower chamber 35 through the inlet ports 36 on the other side.

A manual tension setting means 42 is provided on each of the individual regulators 28 in engagement with the upper springs 32 thereof so that for any particular reference pressure admitted to the upper chamber 34, the exact pressure fed through the outlet ports 37 to the pressure responsive members 15 and 16, etc. for their respective prime movers may be adjusted manually to set the speed therefor.

The master regulator 41 for setting the reference pressure is also an adjustable spring loaded fluid pressure regulator, and will have substantially the same construction as that above described for the individual speed regulators. Thus, as shown in Figure 1 diagrammatically the master regulator 41 includes a hollow casing 50 having a slidable or movable element 51 which divides the hollow casing into an upper chamber 52 and a lower pressure chamber 53. The movable element 51 is disposed medially in the casing by oppositely abutting resilient elements or springs 54 and 55 which engage between opposite sides of the movable element 51 and the walls of the casings 50 opposite said side of the elements.

The lower chamber 53 is provided with an inlet port 56 which communicates through a connecting conduit 57 with the common line or duct 25 so that fluid under pressure from the source 26 can be delivered directly thereto. An outlet port 58 in the lower chamber 53 acts to deliver the pressure fluid at the desired reference pressure to a common reference pressure fluid supply line 59 which communicates with and delivers this pressure fluid to each of the respective inlet ports 40 in the individual regulators 28. The inlet port 56 is throttled by a valve head 60 which engages said port and is connected at its lower end to the valve stem 61 whose upper end is connected in turn to the movable member 51.

The master regulator 41 similar to the individual regulators 27 and 28 is also provided with a leakage orifice as at 56a. Since the pressure fluid source 26 will deliver pressure fluid to the inlet port 56 at constant pressure the pressure acting in the lower chamber 53 and delivered through the outlet port 58 thereof will depend upon the relative difference between the area of the inlet port 56 and the area of the leakage orifice 56a.

To vary the pressure acting in the lower chamber 53 and hence the reference pressure delivered through the outlet 58 and conduit 59 to the respective upper chambers 34 of the individual regulators, the movable element 51 is adjustable through a tension setting element 62 which increases or decreases the tension of the spring element 54 and hence the differential force balance on either side of the movable member 51.

The master control 50 and the individual regulators 27 and 28 are intended to be illustrated in Figure 1 as disposed at a point remote from the point where the prime movers are operated so that a single operation can act from said remote point to control the entire process.

Operation

In operation, the pressure air is delivered to all the regulators and the master regulator adjusted by the tension setting member 62 so as to deliver fluid at a reference pressure less than that of the pressure of the fluid at the pressure source.

Each of the prime movers 10 and 11, etc. can then be started and its speed adjusted by the individual tension setting devices 42 on the respective individual regulators 28 for their particular prime mover as above described.

When all the prime movers are in operation, and the process begun for the variation needed between steps of the process the individual regulators 28 for a particular prime mover can be adjusted by adjusting the tension setting means 42.

If it is found that the process must be increased or decreased then the tension setting member 62 of the master regulator 41 is adjusted to either increase or decrease the reference pressure of the pressure fluid fed simultaneously to each of the individual regulators 28. This will increase or decrease the respective openings of the inlet ports 36, causing increased or decreased pressure to flow to the pressure responsive elements 15 and 16, etc. as above described. The pressure responsive members 15 and 16, etc. act on their respective governors 13 and 14, etc. to increase or decrease the speed of the related prime mover as at 10 and 11. Since, however, each prime mover will be varied an equal amount simultaneously, the process will speed up or slow down depending on the overall operation desired.

In the modified form of the invention shown in Figures 3, 4 and 5, the same result above described is accomplished by an electrical mechanism including proportioning control systems having reversing motors therein which respond to the adjustment of variable external resistances as is more fully described hereinafter.

Figure 3:
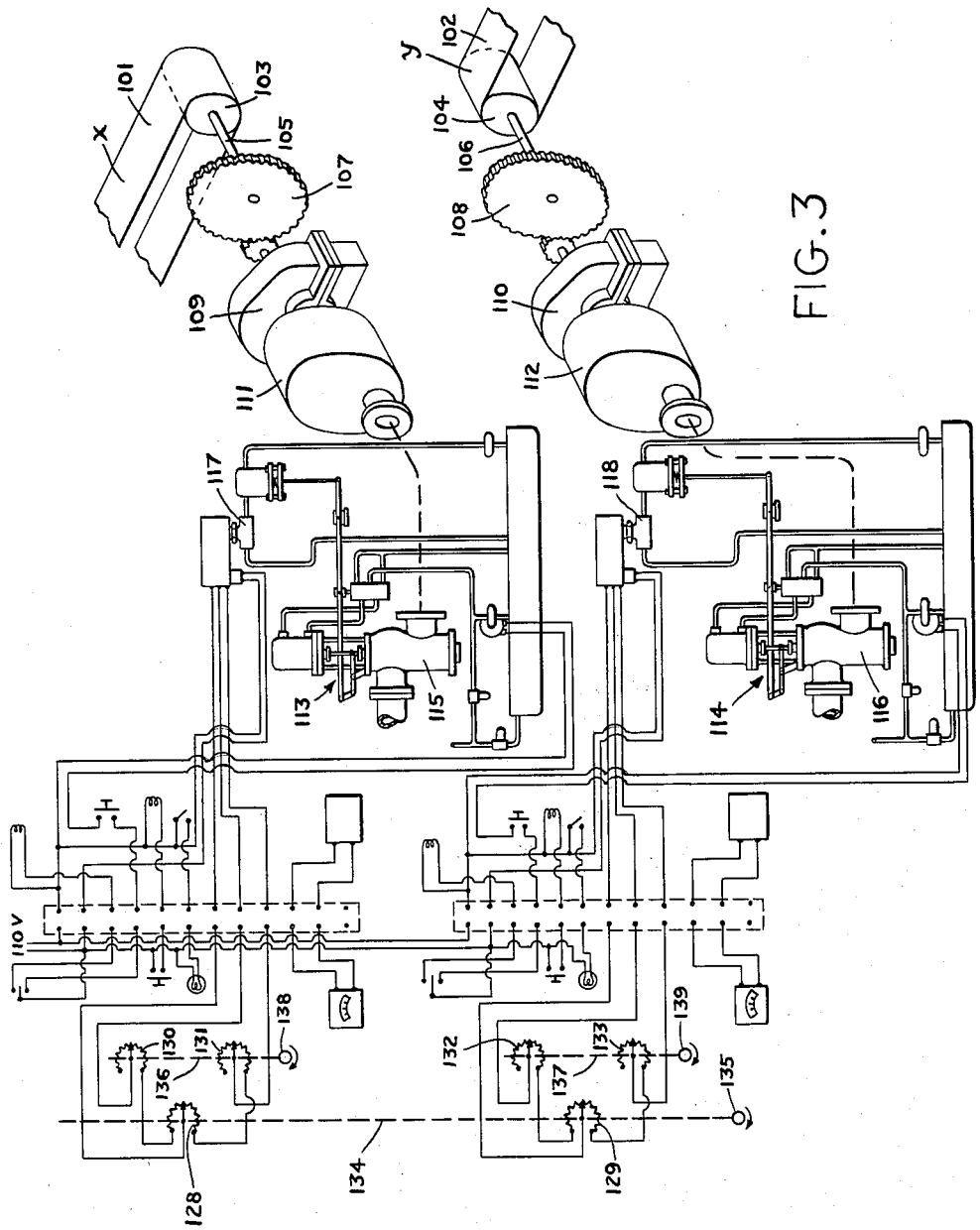
Figure 3 is a diagrammatic view showing a modified form of the invention.

Thus, referring to Figure 3 of the drawings, a fragment of a continuing type process is diagrammatically illustrated to include, for example, a series of conveying steps to be performed by the conveyors designated x and y. While conveying operations are indicated as in the form of the invention shown in Figure 1, it is understood that this could be any of the steps in any continuous type process and that conveying steps are merely utilized for the purpose of illustrating the present invention.

The conveyors x and y include belts 101 and 102 mounted about rollers 103 and 104, only one roller being illustrated for purposes of clarity, it being understood that those skilled in the art are fully familiar with such conveyors and the driving means therefor and for this purpose and reason they are not more fully described herein.

The rollers 103 and 104 are driven through their respective driving shafts 105 and 106, gears 107 and 108 connected to those shafts, and conventional reduction gearing 109 and 110 disposed between the gears 107 and 108 and their respective prime movers 111 and 112. The prime movers may be any suitable type such as steam turbines, internal combustion engines, etc. The speed of each of the prime movers 111 and 113 is controlled by speed governors generally designated 113 and 114 of any suitable type such as the flyball type governor or as shown in the present invention, the oil relay type governor, which type governor is easily purchasable on the open market and is more fully shown and described in Patent No. 2,674,854.

The illustrated governors 113 and 114 act to increase or decrease the driving medium passing through the unit steam chests 115 and 116 of the respective turbines. The governors operate to maintain the desired speed of operation of the prime movers 111 and 112. Heretofore the control of such governors was accomplished through the manual adjustment of the speed control valve generally indicated in such governor at 117 and 118, an enlarged view of one of said valves being shown in Figure 4, only one of said valves being illustrated, as both valves are identical.

Figure 4:
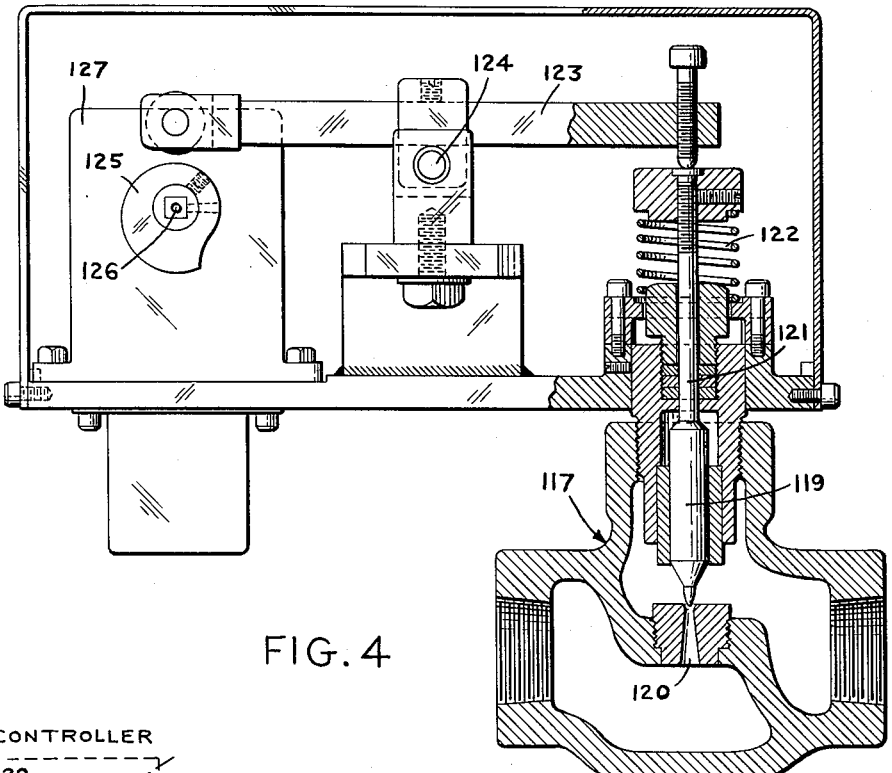
Figure 4 is an enlarged view of the motorized control valve in the fluid operated governor control.

Thus Figure 4 shows that the speed control valves include a needle valve 119 which controls the amount of opening exposed in the orifice 120. The needle valve is connected at the lower end of a valve stem 121 and normally held open by a spring 122. The upper end of the valve stem is engaged by a transverse lever arm 123 pivoted as at 124 to allow the remote end of said lever arm to engage with the cam 125 on the end of the shaft 126 of a reversing motor 127.

The reversing motor 127 forms part of a proportioning control system provided for each of the prime movers in the process, each proportioning controller having a master rheostat as at 128 and 129, and unit rheostats 130, 131, 132 and 133. The master rheostats for each of the proportioning control systems are disposed on a single shaft 134 which is operated manually by turning the knob 135. Similarly, the individual unit controls for each of the prime movers are provided with shafts 136 and 137 also manually operated through the knobs 138 and 139.

Figure 5:
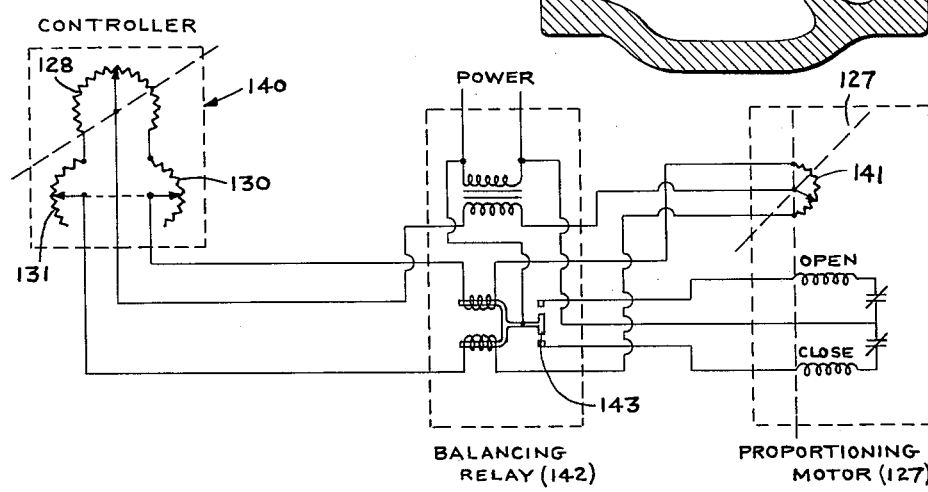
Figure 5 is a diagrammatic sketch of a proportioning control system.

One such proportioning control system is illustrated diagrammatically in Figure 5. Thus the controller portion 140 is shown to include the master rheostat 128 and the unit rheostats 130 and 131. These rheostats through the respective knobs 135 and 138 can be manually adjusted depending on whether it is desired to rotate the motor shaft 126 of the reversing motor in one direction or the other.

The reversing motor contains an adjustable rheostat 141 whose adjustment is under control of the motor position through a linkage with the respective motor shafts 126 of each individual reversing motor.

The adjustable rheostat and the rheostat in the controller 140 are connected in a resistance bridge circuit with a sensitive balancing relay 142. The balancing relay acts to detect any unbalance in the resistance bridge circuit. The relay through the switch mechanism 143 actuates the proportioning motor 127 of each of the respective units to rotate in one direction or the other whenever the resistance bridge circuit is unbalanced due to the manual variation of the rheostats in the controller 140. The movement of the motor and hence its rheostat 141 moves to restore the balance, a definite motor position being attained for each and every position of the rheostats 128, 130 and 131 of the illustrated proportioning controller, which operation is similar in each of the proportioning controllers provided for their respective prime movers.

*Operation*

In operation the master rheostats 128 and 129 are set by manually adjusting the knob 135 to a medial reference position. Each of the prime movers 111, 112, etc. in the conveying process are then adjusted to the desired operating conditions for each of the respective units through their knobs as at 138 and 139.

When it is desired to adjust or vary the operation of any particular unit only the respective knob as at 138 and 139 need be moved.

When it is desired to adjust the entire process, the master rheostats 128 and 129 are adjusted by manually turning the knob 135. This creates a new reference point in each of the systems but by reason of the connecting shaft 134 the new reference points for each system will be proportional to the original reference points set for each step in the system and the total overall effect will be to simultaneously and proportionately speed up or slow down as the motors in the proportioning control systems rotate in the desired direction to rebalance the resistance bridge circuits.

It will be understood that the invention is not to be limited to the specific construction or arrangement of parts shown, but that they may be widely modified within the invention defined by the claims.

What is claimed is:

1. The combination with at least two independent governor controlled prime movers operative in a continuous process to drive a series of operations, said governors each including resetting control means operatively connected thereto for resetting the governor to a predetermined speed setting, of control means comprising a regulating system which includes a first regulator operatively connected to one of said resetting control means, a second regulator operatively connected to the other resetting control means, a master regulator adapted to produce a single output control pressure and operatively connected to each of said first and second regulators, a pressure fluid supply source communicating with each of said regulators, individual adjusting means for said first and second regulators whereby upon manipulation thereof flow from said pressure fluid source through each of said regulators to each of said resetting control means can be individually adjusted to set each of the governors to a desired speed setting, and an individual adjusting means for said master regulator whereby upon manipulation thereof said single output control pressure is varied and the variation is applied simultaneously and directly to said first and second regulators to thereby signal the first and second resetting control means to reset each of the governors to a new speed setting.

2. The combination claimed in claim 1 wherein each regulator includes a leakage orifice.

3. The combination claimed in claim 1 wherein each of said regulators contains a valve means for metering the flow through the regulator to the resetting control means according to the demands of the master regulator.

4. In the combination claimed in claim 2 wherein said first and second regulators comprise a casing having a pair of resilient elements disposed therein, a movable element mounted between said resilient elements, ports in the bottom portion of said casing for receiving fluid from said pressure source, valve means operatively associated with said port for metering fluid flow into said casing, a second port in said bottom portion for connection with said resetting means whereby fluid flow through said casing is flown to said resetting means and a port in the upper portion of said casing for connection with said master regulator.

5. In the combination claimed in claim 4 wherein said master regulator comprises a casing having a pair of resilient elements disposed therein, a movable element mounted between said resilient elements, a port in the bottom portion of said casing for receiving fluid from said pressure source, valve means operatively associated with said port for metering fluid flow into said casing, a second port in said bottom portion for connection with said first and second regulators to signal said first and second regulator to actuate said resetting means to reset the governors to a new speed setting.

6. In a control system, the combination of a primary pneumatic control instrument operative to produce a single output control pressure, means to adjust said instrument to thereby vary said output control pressure, a plurality of secondary pneumatic control instruments each adapted to produce a secondary control pressure, pneumatically operated means and manually operated means in each of said secondary control instruments to vary individually the control pressure produced thereby, means to apply the single output control pressure produced by said primary control instrument simultaneously to the pneumatically operated means of each of said secondary control instruments, a plurality of pneumatically operated devices, and means to apply the control pressure produced by said secondary control instruments individually to said devices.

7. In a control system, a plurality of secondary pneumatic control instruments each adapted to produce a control pressure, pneumatically operated means in each instrument to vary pneumatically the control pressure produced thereby, means in each instrument to vary manually the control pressure produced thereby, a plurality of operated devices, means to apply individually the pressure produced by said instruments to said devices whereby manual or pneumatic adjustment of an instrument will alter the operation of a device connected therewith, a supply of fluid under pressure, a pneumatically operated primary control instrument connected to said supply of fluid and operative to produce a single output control pressure from said supply, means to apply simultaneously said last mentioned output control pressure to each of said pneumatically operated means to adjust pneumatically the secondary control instruments, and manually operated means to adjust said primary control instrument to vary the single output pressure produced thereby.

8. In a control system, a plurality of operating elements, a pneumatically operated device connected to each element to control individually its operation, a plurality of secondary pneumatic control instruments, means to connect one of said control instruments to each device to operate the same in accordance with the adjustment of the instrument, manually operated means to adjust each control instrument, pneumatically operated means to adjust each control instrument, a supply of fluid under pressure, a primary pneumatic control instrument connected to said supply of fluid and operative to produce a single variable output pressure from said supply, manually operated means to adjust said primary control instrument and thereby vary its single output pressure, and means to apply the output pressure of said primary control instrument simultaneously to the pneumatically operated means of each secondary control instrument.

References Cited in the file of this patent

UNITED STATES PATENTS

| | | |
|---|---|---|
| Re. 21,804 | Gorrie | May 20, 1941 |
| 1,154,785 | Lemp | Sept. 28, 1915 |
| 1,937,349 | Kieser | Nov. 28, 1933 |
| 2,103,274 | Sanford | Dec. 28, 1937 |
| 2,320,727 | Herman et al. | June 1, 1943 |
| 2,626,627 | Jung et al. | Jan. 27, 1953 |
| 2,674,854 | Church | Apr. 13, 1954 |
| 2,800,771 | Madison | July 30, 1957 |

FOREIGN PATENTS

| | | |
|---|---|---|
| 131,348 | Great Britain | Aug. 28, 1919 |